United States Patent [19]

Ocard et al.

[11] Patent Number: 5,136,895
[45] Date of Patent: Aug. 11, 1992

[54] STEERING WHEEL FRAME FOR AN AUTOMOBILE VEHICLE OR THE LIKE

[75] Inventors: Paul Ocard, Seloncourt; André Beguier, Montbeliard, both of France

[73] Assignee: ECIA, France

[21] Appl. No.: 723,025

[22] Filed: Jun. 28, 1991

[30] Foreign Application Priority Data

Jul. 3, 1990 [FR] France .................. 90 08404

[51] Int. Cl.⁵ .............................................. B62D 1/04
[52] U.S. Cl. ............................................ 74/552; 280/750
[58] Field of Search ................ 74/552; 280/750; 29/159 B

[56] References Cited

U.S. PATENT DOCUMENTS

| | | | |
|---|---|---|---|
| 1,853,583 | 4/1932 | Smith | 74/552 |
| 4,299,138 | 11/1981 | Sjoquist | 74/552 |
| 4,448,091 | 5/1984 | Bauer et al. | 74/552 |
| 4,635,500 | 1/1987 | Overcashier et al. | 74/552 |

FOREIGN PATENT DOCUMENTS

| | | |
|---|---|---|
| 29616 | 9/1980 | European Pat. Off. . |
| 2346093 | 10/1977 | France . |
| 2470040 | 5/1981 | France . |
| 2486007 | 1/1982 | France .................. 74/552 |
| 2553730 | 4/1985 | France .................. 74/552 |
| 0167367 | 9/1984 | Japan .................. 74/552 |

Primary Examiner—Leslie A. Braun
Assistant Examiner—Winnie Yip
Attorney, Agent, or Firm—Sughrue, Mion, Zinn, Macpeak & Seas

[57] ABSTRACT

The frame comprises a rim (1) formed by a plurality of curved tubes (2,4) inwardly and downwardly bent at their ends so as to form spokes of the steering wheel. The end portions of two adjacent spokes (6, 8 - 7, 9) which pertain to two different tubes are moulded in a common lateral boss (14) of a hub (16). The boss (14) extends longitudinally and projects upwardly from the hub and the end portions of the spokes are vertical and progressively crushed with a curved cross-sectional shape.

11 Claims, 2 Drawing Sheets

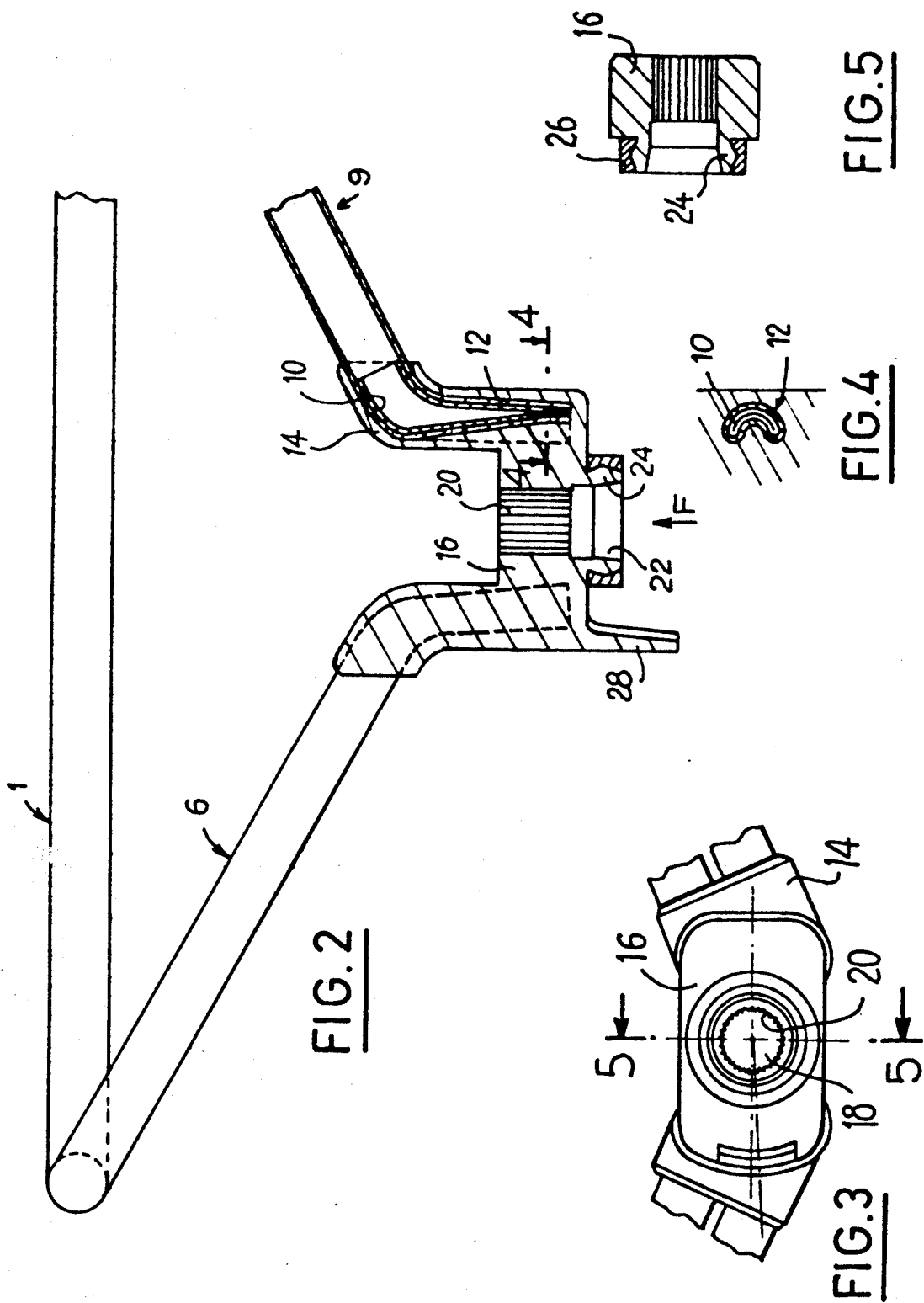

the accompanying drawings, will bring out the features and advantages of the invention.

STEERING WHEEL FRAME FOR AN AUTOMOBILE VEHICLE OR THE LIKE

BACKGROUND OF THE INVENTION

The present invention relates to steering wheels which comprise an annular rim connected by a plurality of radial arms to a hub for fixing to a steering shaft.

It is well known that automobile vehicle steering wheels must be light and easy to use and moreover have a low polar inertia and great strength so as not to break under the action of vibrations due to the motion of the vehicle or under the effect of a shock or the like. For this purpose, they are usually formed by a metal frame preferably composed of wire or tube which is covered with a polyurethane foam or the like affording an attractive appearance and comfort for the driver.

In order to render them lighter, it has been proposed, as described in the U.S. Pat. No. 4,448,091, to form the rim by means of a tube curved into the shape of a ring and bent at its ends so as to constitute a radial arm for fixing to the hub. Unfortunately, such a steering wheel has only one radial arm, which does not afford the comfort required by the vehicle drivers, and moreover the steering wheel is often insufficiently strong.

It has also been proposed, as described in the United Kingdom patent 1,571,902, to form the rim by means of a hollow tube and to connect it by solid arms to a hub moulded onto the ends of these arms. The steering wheel may in this way have the desired number of radial arms, but its weight and size are increased.

SUMMARY OF THE INVENTION

An object of the present invention is to provide a steering wheel frame which both satisfies the requirements of lightness, low polar inertia and strength and provides the steering wheel with the number of radial arms considered preferable for the comfort of the driver.

The invention therefore provides a steering wheel frame comprising a tubular peripheral rim which is connected to a moulded metal hub for fixing to a steering shaft, by a plurality of radial arms, wherein the rim comprises at least two curved tubes in the form of substantially complementary portions of a ring and inwardly and downwardly bent at their ends so as to form steering wheel spokes having axially extending end portions which are progressively crushed and moulded in substantially longitudinal lateral bosses of the hub.

According to another feature of the invention, the two adjacent spokes of two successive curved tubes are moulded side by side in each of the bosses of the hub so as to form a radial arm.

Preferably, a reinforcing tube is mounted inside the end portion of each of the steering wheel spokes and is progressively crushed with said end portion.

Such a steering wheel not only benefits from the qualities of lightness of the tubes constituting the rim and the radial arms but also has great strength owing to both the presence of a plurality of radial arms and the cooperation of the bosses of the hub with the progressively crushed end portions on which these bosses are moulded.

The following description of an embodiment, given by way of a non-limitative example and shown in the accompanying drawings, will bring out the features and advantages of the invention.

BRIEF DESCRIPTION OF THE DRAWINGS

In these drawings:

FIG. 2 is a sectional view taken on line 2—2 of FIG. 1.

FIG. 3 is a bottom view of the hub of the steering wheel in the direction of arrow F of FIG. 2.

FIG. 4 is a sectional view taken on line 4—4 of FIG. 2.

FIG. 5 is a sectional view taken on line 5—5 of FIG. 3.

DESCRIPTION OF A PREFERRED EMBODIMENT

Figure 1:
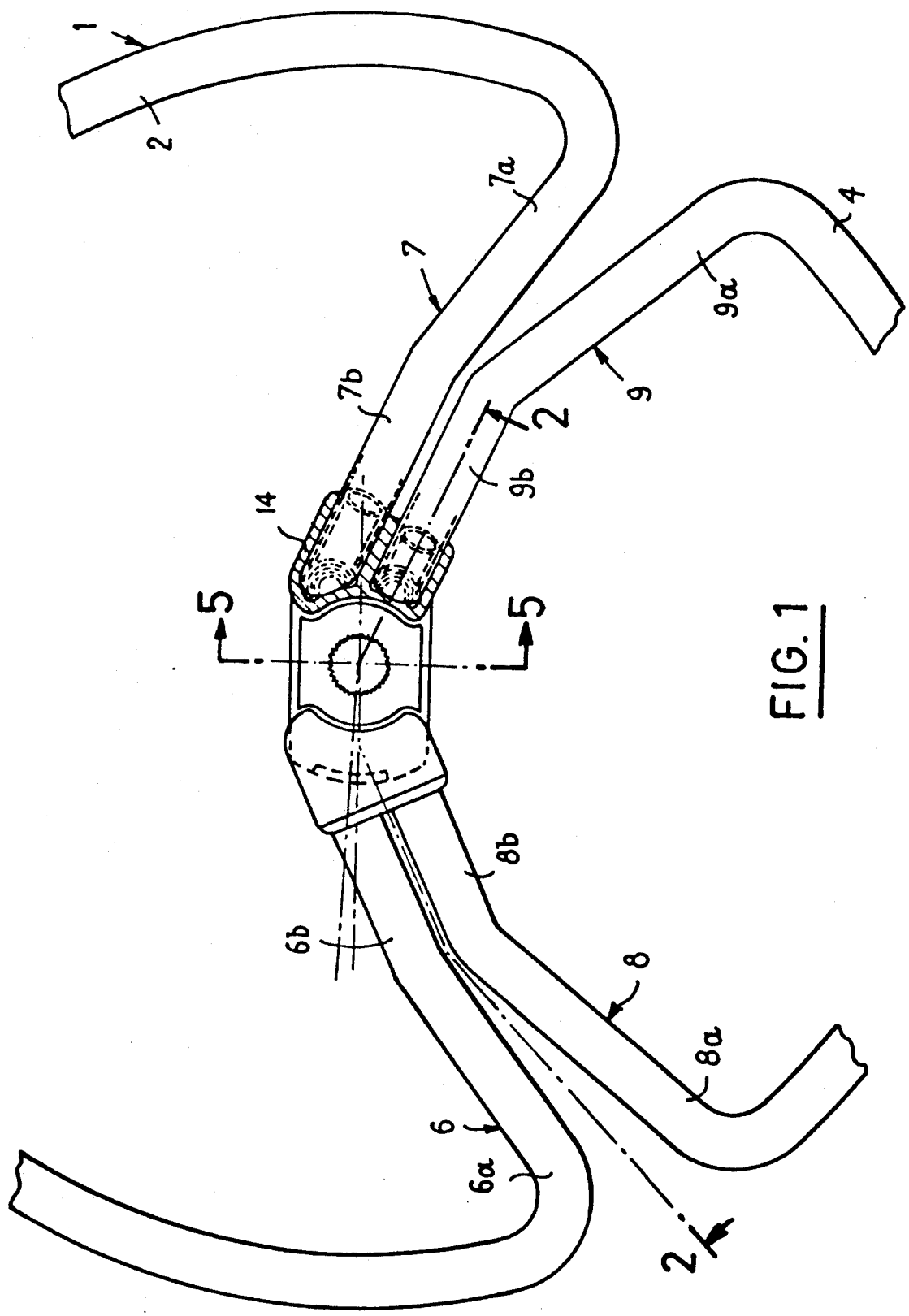
FIG. 1 is a top plan view, with a part cut away, of a steering wheel frame according to the invention.

As shown in the drawings, the steering wheel frame to which the invention relates comprises a peripheral tubular rim 1 which is formed by a plurality of curved tubes, in the shape of substantially complementary portions of a ring disposed in side by side relation. In the illustrated embodiment, the rim 1 is formed by two tubes, respectively 2 and 4, which are curved with the same radius of curvature, one of the tubes, namely the tube 2, extending in more than a semi-circumference whereas the other, namely the tube 4, occupies the complementary sector. Each of these tubes 2 and 4 is bent at its ends so as to form inwardly and downwardly extending spokes respectively 6-7 and 8-9.

The adjacent spokes 6-8 or 7-9 of the two tubes in this way comprise, starting at the rim portion 2, 4, oblique and convergent portions 6a and 8a on one hand, and 7a and 9a on the other, which are extended by rectilinear and parallel portions 6b, 8b and 7b, 9b which have first of all an oblique portion, then a bent portion and then a substantially vertical portion. Placed inside the end portion of each of the spokes is a reinforcing tube 10 whose outside diameter is such that it is closely applied against the inner surface of each of the tubes 6, 7, 8 and 9. This reinforcing tube 10 extends throughout the vertical portion of the tube and inside the bent portion which connects this vertical portion to the oblique portion (FIG. 2).

The whole of the reinforcing tube 10 and vertical end portion 12 of the corresponding spoke has a progressively crushed section so that the spoke is closed in a sealed manner at its lower end. The crushed end portion 12, however, retains a curved section in the shape of a haricot bean, as shown more particularly in FIG. 4, its thickness being gradually reduced down to the contact between the walls. Moulded on the end portions 12 of the two adjacent spokes 6-8 or 7-9 is a boss 14 in one piece with a hub 16 for fixing the steering wheel on a steering shaft (not shown). The bosses 14, namely two in number in the illustrated embodiment, project laterally and longitudinally upwardly relative to the hub 16. Each of them surrounds the vertical end portion 12 of the two adjacent spokes 7-9 or 6-8 and the bent portion of these tubes. The two tubes are in this way completely embedded in the hub material, preferably a light metal such as aluminum or an aluminum alloy, the tubes being isolated from each other but maintained very close to each other. They can in this way constitute the frame of the same radial arm of the steering wheel which is thus firmly fixed to the hub. The hub 16 of course includes in the conventional manner an axial aperture 18 whose upper part is provided with inner splines 20 which cooperate with corresponding splines on the steering wheel shaft, and a conical clamping part 22. Preferably, as shown in FIG. 2, the conical part 22 is formed in an annular extension 24 of the hub 16 and a ring 26 of harder metal, for example steel, is mounted on the extension 24, when clamping the assembly on a steering column, so as to reinforce it. Preferably, as shown, the extension 24 has a double conical outer shape and the ring 26 is reduced in section in its median part so that its inner surface fits this double conical shape. A finger portion 28 extends from the lower part of the hub 26 and is in one piece with the latter and constitutes a return finger portion for the flashing direction indicator. This return finger portion extends vertically downwardly, i.e. in a direction opposed to that of the bosses.

The whole of the hub has a particularly compact shape and a relatively small size in the transverse direction while it permits a strong and reliable connection of the radial arms thereto. This narrow shape facilitates the mounting of the steering wheel, especially in the case where the hub must be inserted in a sleeve of the dashboard which defines an aperture of small diameter.

It will be clear that the hub 16 may have any desired number of bosses 14, that is to say, the number of radial arms of the steering wheel may exceed two and vary in accordance with the type of comfort desired by the driver.

What is claimed is:

1. Steering wheel frame for an automobile vehicle or the like, said frame comprising tubular peripheral rim means, a moulded light metal hub having an longitudinal axis for fixing to a steering shaft and defining substantially longitudinally extending lateral bosses, a plurality of radial arms connecting said rim means to said hub, said rim means comprising at least two tubes each being curved in the shape of substantially complementary ring portions and inwardly and downwardly bent in two end parts so as to form steering wheel spokes constituting said arms and having end portions which extend in directions substantially parallel to said axis and are progressively crushed and moulded in said lateral bosses of said hub, wherein said progressively crushed end portion of each of said steering wheel spokes has a cross-section in a curved haricot bean shape.

2. Steering wheel frame according to claim 1, wherein two adjacent spokes of successive tubes of said at least two tubes are moulded side by side in a common boss of said bosses so as to form one of said radial arms.

3. Steering wheel frame according to claim 1, wherein said two adjacent spokes comprise, starting at said rim means, convergent portions, and parallel portions which are first oblique and then substantially downwardly parallel relative to said axis.

4. Steering wheel frame according to claim 1, further comprising a reinforcing tube placed inside the progressively crushed end portion of each of said steering wheel spokes.

5. Steering wheel frame according to claim 1, wherein said end portion of each of said steering wheel spokes is closed by a crushing of a lower end of said end portion.

6. Steering wheel frame according to claim 3, wherein each of said bosses is moulded on the whole of said progressively crushed end portions of said two steering wheel spokes and on bent portions which connect said end portions to said oblique portions of said steering wheel spokes.

7. Steering wheel frame according to claim 1, wherein said hub comprises in a lower part thereof an annular extension defining a frustoconical inner surface, said frame further comprising a gripping ring surrounding said annular extension.

8. Steering wheel frame according to claim 7, wherein said ring is made from a metal stronger than said light metal of said hub.

9. Steering wheel frame according to claim 8, wherein said light metal is aluminum.

10. Steering wheel frame according to claim 8, wherein said light metal is aluminum alloy.

11. Steering wheel frame according to claim 8, wherein said stronger metal of said ring is steel.

* * * * *